No. 620,651. Patented Mar. 7, 1899.
G. T. HEINEKE.
DRESS GUARD FOR BICYCLES.
(Application filed July 14, 1898.)
(No Model.)
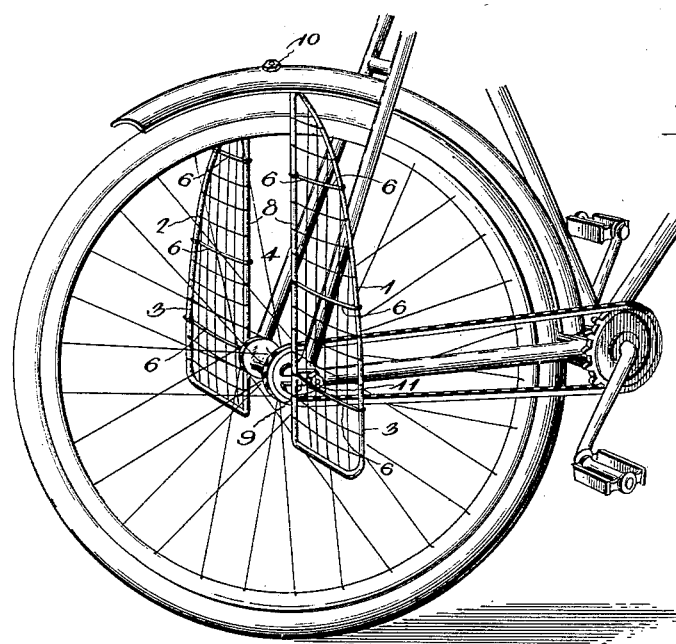
Fig. 1.
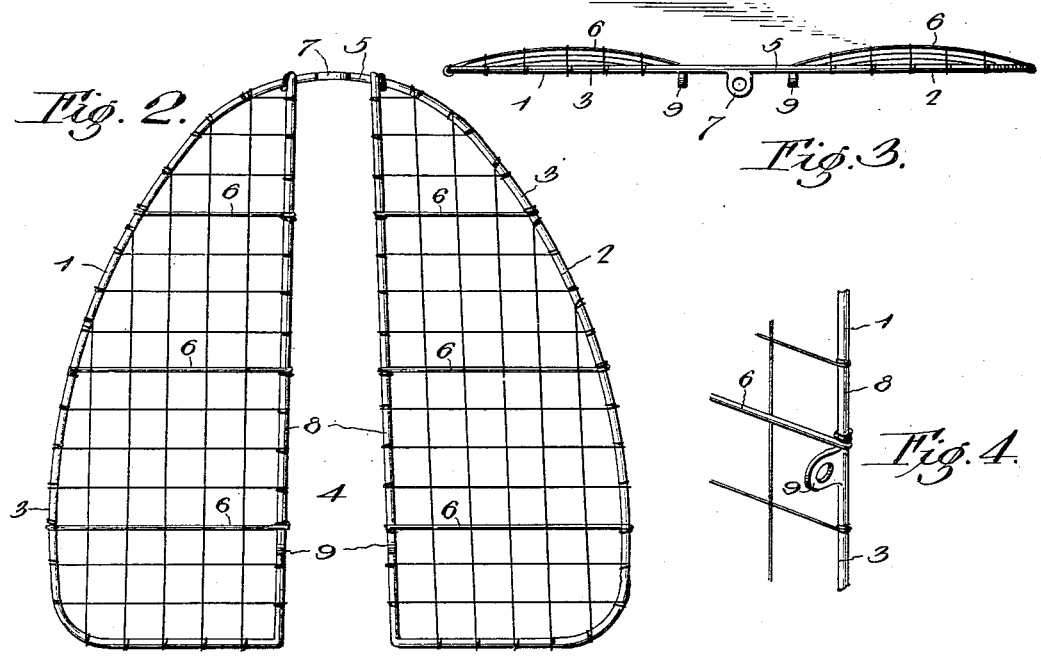
Fig. 2.
Fig. 3.
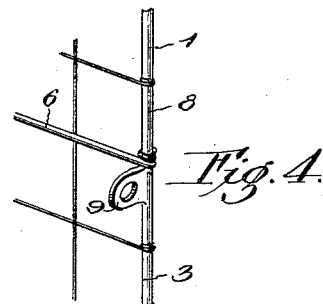
Fig. 4.
Witnesses
Grace T. Heineke, Inventor.
By her Attorneys,

UNITED STATES PATENT OFFICE.

GRACE T. HEINEKE, OF BIRMINGHAM, ALABAMA.

DRESS-GUARD FOR BICYCLES.

SPECIFICATION forming part of Letters Patent No. 620,651, dated March 7, 1899.

Application filed July 14, 1898. Serial No. 685,947. (No model.)

*To all whom it may concern:*

Be it known that I, GRACE T. HEINEKE, a citizen of the United States, residing at Birmingham, in the county of Jefferson and State of Alabama, have invented a new and useful Dress-Guard for Bicycles, of which the following is a specification.

This invention relates to dress-guards for ladies' bicycles.

The object of the present invention is to provide a dress-guard which is applicable to any of the common or ordinary forms of bicycles and which is supported in position by the mud-guard for the rear wheel and the axle thereof.

Other objects and advantages of my improvement will be hereinafter more fully described, shown in the drawings, and particularly pointed out in the claims.

In the drawings, Figure 1 is a perspective view of the rear portion of a bicycle having the device applied thereto. Fig. 2 is a front elevation of the guard removed. Fig. 3 is a top plan view thereof. Fig. 4 is a detail perspective view showing the eyes for attaching to the axle.

Corresponding parts in the several figures are denoted by like characters of reference.

Referring to the drawings, 1 and 2 designate the two equal sections of the guard, which are preferably formed from a single length of stout wire 3 or other suitably strong and light material. This wire 3, forming the frame of the guard, is bent or shaped to provide the sections 1 and 2, which are separated by the space 4, open at the bottom to receive the rear wheel of the bicycle, but closed at the top, as at 5, whereby the sections are connected together. The sides 8 of the opening 4 incline outwardly from the top to the bottom thereof to provide for the inclination of the spokes of the wheel. The sections are braced by transverse rods 6 and are covered by any suitable screening desired, as shown. The screen portion of the guard is preferably bulged rearwardly in respect to the bicycle, forming a concaved basket, as indicated in Fig. 3. The general shape of the guard is preferably straight at the bottom and rounded at its lower corner and the sides curving inwardly toward the top thereof, so as to occupy as little extra space as possible, and the sections are arranged in the same plane.

As a means for attaching the guard to the bicycle I provide an eye 7 upon the connecting-rod 5, at the middle thereof and extending forward from the plane of the guard. Two other similar eyes 9 are provided upon the side 8 of the opening 4, near its lower end. The eyes 7 and 9 may be formed in any preferred manner, as shown in Fig. 4, or by twisting the wire 3 upon itself, and thereby producing the eye in a cheap and convenient manner.

To mount the guard in position, it is simply necessary to remove the nut and bolt 10, which holds the usual brace-rod to the mud-guard, and also the nuts 11 at each end of the rear axle, whereby the said brace-rod may be removed. The dress-guard is then placed upon the bicycle, with the rear wheel thereof received within the opening 4 and the sections 1 and 2 extending at each side of the wheel and at approximately right angles to the plane of the bicycle. The nut and bolt 10 are then used to fasten the upper end of the dress-guard to the under side of the mud-guard through the opening from which the bolt has already been removed. The eyes 9 upon the sides 8 are then placed upon the ends of the axle of the rear wheel, outside of the rear forks, and the nuts 11 are then placed upon the axle and tightened thereon to secure the dress-guard firmly in position. A long walking-skirt may be worn when riding a bicycle equipped with my dress-guard, as it prevents the folds of the dress from getting between the spokes of the wheel.

It will be noted that the securing-eyes extend toward the front of the bicycle, whereby the guard is disposed in the rear of the vertical axis of the rear wheel. The purpose of this disposition of the guard is to permit of the skirts of the rider being blown or trailed backward as far as expedient in a straight line, so as not to bunch together and be caught in the drive-chain. The skirts of a rider are most frequently caught by the spokes of the wheel beyond the rear end of the frame and wrapped about the rear forks, and therefore the preferable position of the guard is, as shown, just a trifle beyond the vertical axis of the wheel, whereby the ends of the skirts strike against the guard and are prevented from catching in the spokes. Should the guard be placed in advance of the vertical axis of the wheel, the skirts would not be permitted to trail as far as is necessary and would therefore bunch up and be damaged by the chain.

By reason of the rigid connection 5 of the sections a substantially integral structure is provided, whereby the sections of the guard may be simultaneously positioned and removed as a whole.

My invention is capable of being attached to any of the ordinary bicycles having the usual mud-guard for the rear wheel without altering the form or structure thereof, and it also serves as a support for the mud-guard. I have shown the device placed in a vertical position; but it may be fastened to the mud-guard at any point which will incline the guard forward. By the use of ordinary screening or cords, as desired, stretched upon the frame of the sections the device is made very light in weight and does not impede the progress of the bicycle.

Changes in the form, proportion, and minor details may be made without departing from the spirit and scope or sacrificing any of the advantages of my invention, and therefore I do not wish to be understood as limiting myself to the precise construction and arrangement as herein set forth.

Having thus described my invention, what is claimed as new, and desired to be secured by Letters Patent, is—

1. A dress-guard for bicycles and the like, comprising a pair of duplicate sections, the frame of these sections being formed from a single length of material, with the sections arranged in the same transverse plane, spaced apart and connected together at their upper ends and having an eye provided at the top, similar eyes provided near the lower inner sides of the respective sections, whereby the guard may be attached both to the usual mud-guard and to the axle of the rear wheel, and disposed equally upon opposite sides thereof at approximately right angles to the plane of the bicycle, substantially as shown and described.

2. A dress-guard for bicycles and the like, comprising a pair of duplicate sections, the sections being arranged in the same transverse plane, spaced apart a suitable distance and having a connection at their upper ends, an eye provided upon the connection, and other eyes provided upon the inner lower sides of the respective sections, the latter eyes being arranged with their openings alined transversely of the sections, the eye on the connection of the sections being adapted to be secured to the under side of the usual mud-guard for the rear wheel by means of a suitable bolt or screw, and the other eyes being adapted to be fitted upon the respective ends of the axle of the rear wheel and confined against the frame of the bicycle by means of the usual nuts, whereby the sections are supported on opposite sides of the rear wheel, at approximately right angles thereto, and form a support for the rear end of the mud-guard, substantially as shown and described.

3. A dress-guard for bicycles and the like, comprising a pair of open-work sections connected rigidly together at their upper ends only, said connection being a part of the frame of the sections and the latter forming substantially an integral structure for simultaneous removal and application, the sections being spaced apart and providing an intermediate opening or space between the sections, which space is open at its lower end, the guard thus formed being adapted to be fitted to the bicycle with the sections arranged upon opposite sides of the rear wheel and at approximately right angles thereto, the intermediate opening or space forming a means whereby the guard may be positioned as a whole upon the bicycle embracing the rear wheel, substantially as shown and described.

In testimony that I claim the foregoing as my own I have hereto affixed my signature in the presence of two witnesses.

GRACE T. HEINEKE.

Witnesses:
HENRY B. GUY,
JNO. D. ELLIOTT.